United States Patent
PrudHomme-Lacroix et al.

(10) Patent No.: US 8,626,383 B2
(45) Date of Patent: Jan. 7, 2014

(54) METHOD OF OPTIMIZING THE LOADING OF LOADS IN A VEHICLE

(75) Inventors: Pierre PrudHomme-Lacroix, Vitrolles (FR); Laurence Maille, Marseille (FR)

(73) Assignee: Eurocopter, Marignane Cedex (FR)

(*) Notice: Subject to any disclaimer, the term of this patent is extended or adjusted under 35 U.S.C. 154(b) by 68 days.

(21) Appl. No.: 13/371,691

(22) Filed: Feb. 13, 2012

(65) Prior Publication Data

US 2012/0221235 A1   Aug. 30, 2012

(30) Foreign Application Priority Data

Feb. 28, 2011 (FR) ...................................... 11 00589

(51) Int. Cl.
    *G06F 7/00* (2006.01)
(52) U.S. Cl.
    USPC ................. 701/36; 701/49; 701/70; 700/213; 244/118.1; 244/118.2; 244/127
(58) Field of Classification Search
    USPC ................... 701/3, 19, 21, 22, 36, 49, 50, 70; 700/213, 214; 244/117 R, 118.1, 118.2, 244/118.5, 118.6, 127, 137.1
    See application file for complete search history.

(56) References Cited

U.S. PATENT DOCUMENTS

| | | | |
|---|---|---|---|
| 7,475,898 B2 * | 1/2009 | Long | 280/404 |
| 8,337,127 B2 * | 12/2012 | Moradians et al. | 410/104 |
| 2005/0246057 A1 | 11/2005 | Olin | |
| 2009/0192846 A1 * | 7/2009 | Stefani | 705/7 |
| 2010/0222993 A1 | 9/2010 | Brainard | |

FOREIGN PATENT DOCUMENTS

| | | | |
|---|---|---|---|
| FR | 2460841 A1 | | 1/1981 |
| WO | 2007119898 A1 | | 10/2007 |

OTHER PUBLICATIONS

Aircraft Load Planning and the Computer Description and Review. By Louis A. Martin-Vega, pp. 357-369 vol. 9 No. 4 dated: Jan. 1, 1985.
AALPS a Knowledge-Based System for Aircraft Loading. By Debra Anderson and Charles Ortiz, pp. 71-79 vol. 1 No. 4 dated: Jan. 1, 1987.
Optimization of Aircraft Container Loading. By Marcel Mongeau, pp. 140-150 Volume.

* cited by examiner

*Primary Examiner* — Rami Khatib
(74) *Attorney, Agent, or Firm* — Brooks Kushman P.C.

(57) ABSTRACT

A method of determining the locations of loads in a vehicle in such a manner as to ensure mission safety in terms of loads being retained in the aircraft. On the basis of vehicle parameters, the anchor points available in this type of vehicle for retaining the loads are identified. As a function of the available loading volume(s), a possible loading configuration is calculated using at least some of the available anchor points, at least some of the retaining means, and the characteristics of the loads. The forces that might be exerted on the selected anchor points are verified as being less than maximum limits. The calculated loading configuration is confirmed, otherwise a new loading configuration is calculated.

12 Claims, 2 Drawing Sheets

METHOD OF OPTIMIZING THE LOADING OF LOADS IN A VEHICLE

CROSS REFERENCE TO RELATED APPLICATIONS

This application claims priority to FR 11 00589 filed on Feb. 28, 2011, the disclosure of which is incorporated in its entirety by reference herein.

BACKGROUND OF THE INVENTION (1) Field of the Invention

The present invention relates to the general technical field of transporting freight in a vehicle. The term "vehicle" should be understood as meaning any type of transport means such as a truck, a motor car, a train, a boat, or an aircraft. The aircraft may be a fixed wing aircraft or a rotary wing aircraft such as a rotorcraft, a helicopter, a hybrid helicopter, or any other type of aircraft.

In the present description, reference is made more particularly to aircraft, however the invention is not limited in any way to such a particular application.

(2) Description of Related Art

It is very important to manage loads on an aircraft both from an economic point of view and in terms of the safety of said aircraft in flight. It is constantly desired to load aircraft with as many loads as possible while improving safety in flight, or in general during a mission performed by a vehicle transporting the freight. Safety in flight is improved in particular by appropriately distributing loads as a function of their weights relative to the center of gravity of the aircraft. In terms of flight missions, the stowage of loads is managed relative to potential loading volumes in the aircraft.

Reference is made more particularly to loads that are for loading in the cabin or the hold, for example, however the invention also applies to loads placed outside the aircraft. In certain circumstances, the aircraft may be loaded with loads both inside and outside the cabin and/or the hold.

The present invention relates more particularly to a method of providing assistance in loading loads into a vehicle, in particular an aircraft, and more particularly a rotary wing aircraft such as a rotorcraft.

In order to ensure safety in flight of an aircraft, it is necessary to ensure that loads are retained, i.e. prevented from moving, during a flight. Retaining loads that are loaded in a predefined arrangement serves in general to obtain a degree of balancing in the distribution of the loads and also enables an acceptable location to be achieved for the center of gravity of the loaded aircraft. This generally makes it easier to pilot the aircraft.

By way of example, document U.S. 2010/0222993 discloses a system of managing the loading of a rotary wing aircraft, and more precisely a method that calculates the position of the center of gravity of the loaded aircraft and also acceptable limits for positioning said center of gravity, such that the crew can determine in real time information associated with the current loading and also the position of the center of gravity. The use of such a method is certainly advantageous, but it does not serve to satisfy the objects of the present invention in terms of optimizing safety of the aircraft in various loading and flight configurations.

Document WO 2007/119898 also discloses a method and a system for optimizing the distribution of freight in an aircraft in order to optimize centering of said loads. The method described is based on an algorithm for calculating a loading configuration as a function of the weights, the distribution, and the positioning of the loads. The method described thus makes it possible to take account of information associated with the loads and to propose acceptable loading configurations to the pilot. The method described is likewise insufficient for guaranteeing optimized flight safety for the aircraft in all of its flight configurations.

It is known to propose loading configurations for an aircraft by calculation as a function of vehicle parameters and as a function of load characteristics. The vehicle parameters are identified in a database and the load characteristics are determined depending on the particular loads to be loaded on board the vehicle. The operator selects vehicle parameters and inputs the characteristics of the loads on the basis of which a computer executes an algorithm for determining the best possible loading configuration.

By way of example, reference may be made to the following documents:

L. A. Martin-Vega: "Aircraft load planning and computer description and review", extracted from Computers & Industrial Engineering, Vol. 9, No. 4, pp. 357-369;

Debra Anderson, et al.: "ALLPS a knowledge-based system for aircraft loading", extracted from IEEE Expert, IEEE service center, Vol. 1, No. 4, pp. 71-79;

M. Monceau, et al.: "Optimization of aircraft container loading", extracted from IEEE Transactions on Aerospace and Electronic Systems, extracted from IEEE service center, Vol. 39, No. 1, pp. 140-150;

FR 2 460 841 (Messerschmitt Boelkow Blohm); and

U.S. 2005/246057 (C. J. Olin, et al.).

According to those documents, the loading configurations obtained by calculation supply a distribution loads inside the aircraft as a function of the arrangement of various spaces available for use in loading. The looked-for result is to obtain the best possible distribution of loads as a function of the individual weights of the loads, of the overall weight of the loads taken together, and of the natures of the loads, such as in particular possibly perishable foodstuffs. The distribution is calculated relative to the center of gravity of the aircraft and the storage volumes available on board the aircraft. Finally, it is desired to minimize loss of energy in terms of fuel consumption and/or to distribute the loads as well as possible in view of their weights relative to balancing the loaded aircraft.

More particularly, according to U.S. 2005/246057 (C. J. Olin, et al.), vehicle parameters relating to anchor points of an aircraft are listed in a database. The database also lists current loading configurations for a given aircraft, on the basis of the actual presence, locations, and orientations of located anchor members, each of which comprises an individually by anchor point of the aircraft. From the database, the operator identifies and selects the vehicle parameters of the aircraft that is to be loaded with loads and for which the current loading configuration is listed. The operator inputs the characteristics of the loads for loading on the aircraft. A computer determines whether the characteristics of the loads are compatible with the current loading configuration of the aircraft, and if not it proposes a new loading configuration.

BRIEF SUMMARY OF THE INVENTION

An object of the present invention is to propose a method enabling the above-mentioned limitations to be overcome, by providing the crew of an aircraft with an optimized configuration for loading the vehicle.

More particularly, the present invention seeks to provide such a method that provides optimized safety for loading the vehicle with loads.

The method proposed by the present invention also seeks to simplify loading operations in terms of operating the vehicle, while maximizing potential loading.

For example, the present invention seeks to provide loading configurations for a vehicle that comply with the requirements of regulations and standards, such as the Federal Aviation Administration (FAA) rules or the European Aviation Safety Agency (EASA) regulations that are in force for rotorcraft.

The objects given to the invention are achieved with the help of a method of determining the locations of loads in a vehicle, in such a manner as to ensure mission safety in terms of retaining the loads in the vehicle. The method implements at least one database that is common to a fleet of vehicles, and a computer for implementing an algorithm on the basis of parameters specific to a vehicle type, referred to as vehicle parameters, being identified and selected in the database, and on the basis of the characteristics of the loads, including the number, the weights, and the volumes of the loads.

The method of the present invention comprises the following operations:
- on the basis of the vehicle parameters, identifying available anchor points in this type of vehicle for retaining the loads, thereby determining a possible loading configuration;
- verifying that the total weight of the loads does not exceed a predefined limit; and
- as a function of at least one available loading volume, calculating a possible loading configuration from among predefined possible loading configurations of the vehicle, depending at least on said available anchor points and depending on the characteristics of the loads;
- on the basis of the vehicle parameters, determining maximum accelerations and decelerations of the vehicle depending on various authorized mission configurations and depending on rules specific to said vehicle and included in the database;
- on the basis of vehicle parameters, determining available retention means for connecting the loads to anchor points;
- as a function of at least one available loading volume, calculating a possible loading configuration from among predefined possible loading configurations of the vehicle, depending at least on said available anchor points, depending on at least some retention means, and depending on the characteristics of the loads;
- on the basis of the vehicle parameters, determining the forces that might be exerted on each available anchor point and also the acceptable movements of the loads;
- verifying that said possible movements of the loads and said forces that might be exerted on the selected anchor points remain below predefined maximum limits;
- an operator confirming the calculated loading configuration or else the operator requesting another loading configuration to be defined by returning to the step of calculating a possible loading configuration from among the predefined possible loading configurations of the vehicle; and then
- an operator on the site where loads are loaded onto the vehicle verifying whether the tension applied on each anchor point is in compliance by comparing said tensions with predetermined values of pretensions on the retention means while retaining the loads.

The method of the invention serves to distribute the loads over the vehicle not only as a function of their weights, but also by proposing loading configurations that incorporate safe stowage of loads having a variety of respective shapes and weights. Secure retention of such loads on board the vehicle in any flight configuration is incorporated in the setting up of this flight configuration by the computer.

In an implementation of the method in accordance with the invention, the method includes a display step of displaying the confirmed loading configuration on a screen or the like.

In an implementation of the method in accordance with the invention, said display step comprises displaying the loading schedule, the locations for loading the various loaded loads, the various selected anchor points, and the selected retention means.

In an implementation, the loads comprise freight made up of one or more elements.

In an implementation of the method in accordance with the invention, the method is implemented by an algorithm loaded into a computer of a management system of the vehicle such as an on-board avionics system of an aircraft.

In another implementation of the method in accordance with the invention, the method is implemented by an algorithm loaded into a computer that is independent of a management system of the vehicle, such as an avionics system on board an aircraft, e.g. a laptop computer for implementing the steps of said method.

In an implementation of the method in accordance with the invention, the display step is performed by means of a multifunction screen of the instrument panel of the vehicle or the aircraft in order to display the loading configuration(s).

In an implementation of the method in accordance with the invention, the method includes the operation of selecting anchor points and retention means so as to constitute connections between the load(s) and said anchor points, so as to present angles relative to the vertical and/or relative to the horizontal that lie within predefined angle ranges.

In an implementation of the method in accordance with the invention, the method uses at least one database that is common to an entire fleet of vehicles or of aircraft.

For example, at least one database includes data relating to regulations, to standards, and/or to particular specifications of the operator of the vehicle.

In an implementation of the method in accordance with the invention, the method includes the operation of defining a zone that is designated for a special use, e.g. in the cabin or the hold, and that is not available for loading. This is particularly advantageous during a mission should the pilot need to unload some of the freight or to load additional freight, or indeed for reserving said special-use zone for transporting an unexpected load.

In an implementation of the method in accordance with the invention, the method includes the operation of neutralizing anchor points that are not usable for retaining loads, by making them unavailable for retaining such loads.

In another implementation of a method in accordance with the invention, the method uses a computer for producing at the time the vehicle is designed a paper document such as a chart suitable for informing the pilot of the vehicle of an optimum loading configuration.

In a use in accordance with the invention, the method is applied to a vehicle of the rotorcraft or helicopter kind.

The invention also seeks to provide a computer program for implementing the above-specified method.

This object given to the invention is achieved with the help of a computer program comprising a set of instructions and data for implementing the calculation steps of the method in accordance with the invention. Said instructions are loaded onto a medium for incorporating in a computer or for being connected to a computer. Said instructions are executed by the computer with the help of at least one database that is suitable for being updated.

The method includes in particular a step of updating the at least one database used in the method, either regularly or on the basis of newly available information by an operator, in particular a pilot of the vehicle.

An advantage of the method in accordance with the invention lies in being applicable to various types of aircraft, e.g. to an entire fleet, in spite of the complexity associated with managing loads in different aircraft. The method in accordance with the invention makes it possible to harmonize management and to use for aircrafts that are different from one another. Such management is also extremely simple to use for the operator of the aircraft.

Another advantage of the method in accordance with the invention lies in the fact that it makes it possible to take special cases into account, e.g. associated with a particular mission or flight plan. The method is implemented in particular with the help of one or more databases that are suitable for being updated by an operator, in particular a pilot, either regularly or to take account of newly-available information. Such information may be temporary, e.g. relating to the unavailability of certain anchor points in a fuselage or on a floor, to unusual flying conditions, or to freight being unloaded in part during a mission.

BRIEF DESCRIPTION OF THE SEVERAL VIEWS OF THE DRAWINGS

The invention and its advantages appear in greater detail from the following description of an implementation given by way of non-limiting illustration and with reference to the accompanying figures, in which.

Elements that are present in more than one of the figures are given the same numerical or alphanumerical references in each of them.

DETAILED DESCRIPTION OF THE INVENTION

The description below, given by way of non-limiting example, relates more particularly to a vehicle such as an aircraft of the airplane, rotorcraft, or helicopter kind. Any characteristic that is described in such an application may be transposed to any other type of vehicle without going beyond the ambit of the present invention.

Figure 1:
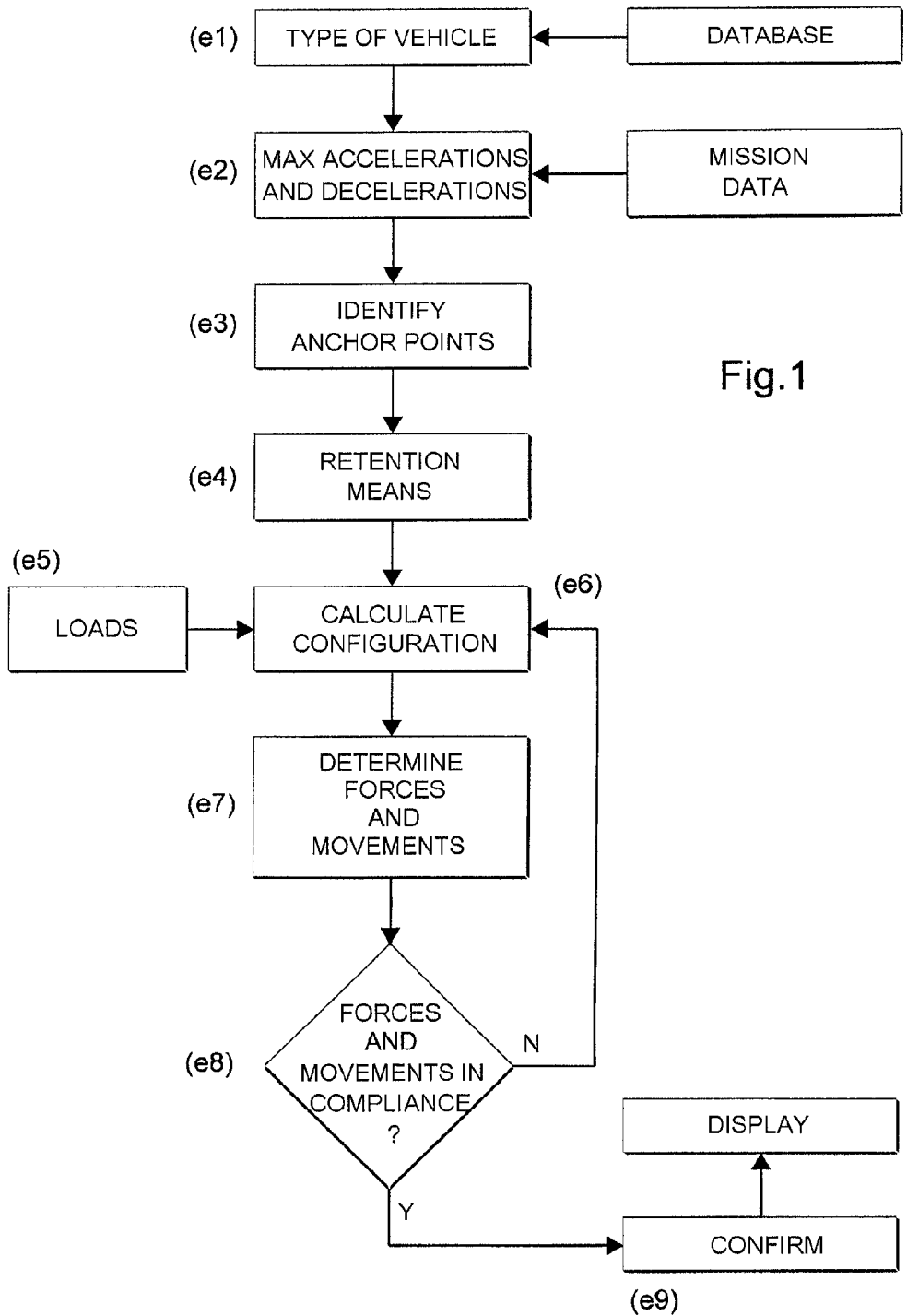
FIG. 1 is a flow chart of an implementation of the method in accordance with the invention.

FIG. 1 is a flow chart of an implementation of the method in accordance with the invention, which method consists in a set of successive steps that are described below.

In a step (e1), the method comprises operations of an operator identifying and selecting a type of aircraft using input means, such as a multiple choice menu or the like, and using at least one database 5 having parameters that are specific to the type of aircraft, referred to below as aircraft parameters.

In a step (e2), a computer uses the aircraft parameters to determine the maximum accelerations and decelerations for the aircraft under various flight configurations as authorized or expected during a mission.

In a step (e3), the computer uses the aircraft parameters to identify anchor points that are available in this type of aircraft for retaining the loads.

In a step (e4), the computer uses the aircraft parameters to determine the retention means available that are suitable for connecting the loads to the anchor points.

In a step (e5), an operator determines and stores in the computer the characteristics of the loads, including in particular the numbers, the weights, and the volumes of the loads. The computer uses the vehicle parameters to verify that the total weight of the loads does not exceed a predefined limit.

In step (e6), the computer calculates, as a function of the available loading volume(s), a potential configuration for loading by making use of at least some of the anchor points available on board the aircraft, at least one or more of the retention means available on board the aircraft, and also the previously-stored characteristics of the loads.

In a step (e7), the computer uses the aircraft parameters to determine the forces that might be exerted on each available anchor point and the movements to which the loads might be subjected.

In a step (e8), the computer verifies that the forces liable to act on the selected anchor points and the movements of the loads remain below predefined maximum limits.

In a step (e9), the operator confirms the calculated loading configuration or issues a request for execution by the computer of calculation operations starting from step (e6) in order to define another loading configuration or to optimize the previously-calculated loading configuration.

In an implementation of the method in accordance with the invention, the confirmed loading configuration is displayed on a screen 6 or some analogous display device, or analogously by means of a device for printing a document.

In an implementation of the method in accordance with the invention, the method includes an operation of displaying the schedule of loading, the locations for loading the various loads, the various selected anchor points, and also the selected retention means.

In an implementation of the method in accordance with the invention, the method implements means for monitoring the tension applied to each anchor point by means of pretensions on the retention means while retaining the load(s). Such monitoring means are constituted in particular by conventional mechanical measurement means, which deliver pretension values that can be compared with the recommendations displayed as a result of executing the method, in particular as displayed on the screen 6.

The anchor points may be constituted, for example, by rings, snap-hooks, or other hooks fastened to the fuselage, or rails provided in the floor of the cabin, of the hold, etc.

By way of example, the retention means comprise a net covering the loads and fastened to the anchor points via connections constituted by straps. Advantageously, each strap has a mechanical tensioner. The net may be an adjustable net, e.g. in terms of adjusting the size of its mesh, so as to adapt as well as possible to the shape of the loads.

In an example, the loads comprise freight made up of one or more elements.

By way of example, the method is implemented by an algorithm loaded into a computer 4 of the avionics system on board the aircraft.

By way of example, the method is implemented by an algorithm loaded into a computer 4 that is independent of an avionics system 2 of the aircraft, such as a laptop computer.

By way of example, the method implements a multifunction screen of the aircraft instrument panel in order to display the loading configurations.

The method comprises an operation of the computer selecting anchor points and retaining means available on the aircraft in order to constitute connections between the load(s)

and said anchor points. Said connections present angles relative to the vertical or relative to the horizontal, lying within predefined angle ranges depending on the arrangement and the positions of the anchor points relative to one another and relative to retention means available on the aircraft.

The method advantageously implements at least one database 5 common to an entire fleet of aircraft with the respective vehicle parameters thereof being stored in said database 5. The database 5 thus has all of the information relating to the aircraft and needed for implementing the method.

By way of example, at least one database includes data relating to regulations, standards, and/or particular specifications of the operator of the aircraft.

In a particular step of the method, a zone for a special use is defined, e.g. in the cabin or the hold. Such a zone for special use is considered as being unavailable for loading, since it is reserved for loading an unexpected load, such as a stretcher.

In a particular step of the method, anchor points that are defined as being unavailable or already in use for other functions are neutralized by being made unavailable for retaining loads in a definition of a loading configuration made by the computer.

The method in accordance with the invention thus makes it possible to define an available loading space for a given aircraft during a given utilization.

The method in accordance with the invention proposes one or more loading configurations to the pilot, which configurations take account of the distribution of freight, the volume of each element of freight, the distribution of anchor points, the positioning of the pilot and any passengers on board the aircraft, and the maximum forces exerted on each of the anchor points. The method thus makes it possible to take account of the strength of the various available retention means and also the dimensions of the openings into the cabin or the hold through which elements of freight are to be loaded, where such information forms part of the vehicle parameters.

Figure 2:
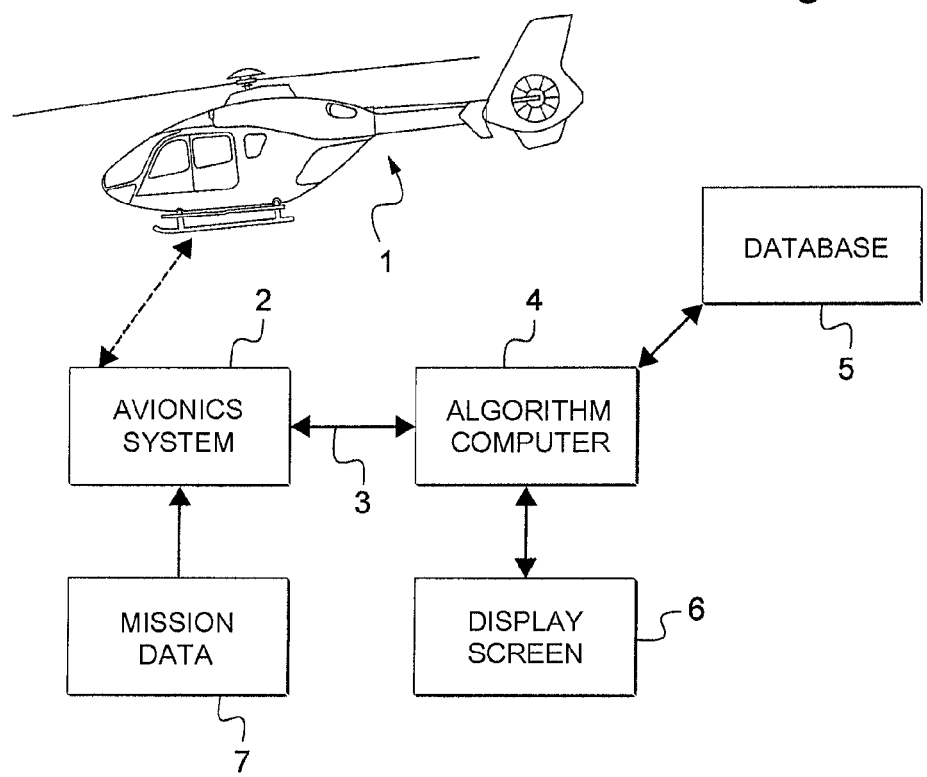
FIG. 2 is a diagram showing the means involved in implementing the method in accordance with the invention.

FIG. 2 is a diagrammatic view of means involved in an implementation of the method in accordance with the invention. The aircraft, e.g. a helicopter 1, includes an on-board avionics system 2. The on-board avionics systems 2 is connected via a wired or wireless connection 3 to a computer 4 having an algorithm loaded therein for executing the method in accordance with the invention.

By way of example, the computer 4 incorporates a database 5 that may be added to or modified by the pilot or by a member of the crew.

The display screen 6 serves to present the pilot with the loading configurations that are suitable for being confirmed on the basis of implementing the method in accordance with the invention.

In a variant, the computer 4 and the database 5 may also be incorporated in the on-board avionics system 2.

In another implementation in accordance with the invention, the method consists, while designing the vehicle, in using the computer to produce a paper document such as a chart, enabling the pilot to determine the best loading configuration. The various possible loading configurations are thus defined at the time the aircraft or the vehicle is designed.

The invention also provides a computer program including a set of instructions and data for implementing the steps of the method in accordance with the invention. By way of example, the instructions may be recorded on a medium suitable for being incorporated in the computer 4 or for being connected to the computer 4.

The instructions are executed by the computer 4 with the help of the database 5. The computer 4 may also be designed to store flight configurations. It thus conserves a trace of the weights and the stowage arrangements of the loads, which information may be used, for example, in order to reconstruct how an accident took place.

Naturally, the present invention may be subjected to numerous variations as to its implementation. Although several implementations are described, it will readily be understood that it is not conceivable to identify exhaustively all possible implementations. It is naturally possible to envisage replacing any of the means described or of the steps described by equivalent means or by an equivalent step, without going beyond the ambit of the present invention.

What is claimed is:

1. A method of determining a loading configuration for loads in a vehicle, so as to ensure mission safety in terms of loads being retained in the vehicle, the method comprising:
   providing a database having a plurality of vehicle parameters for each of a plurality of vehicle types;
   receiving, at a computer in communication with the database, an indication of a vehicle to be loaded with loads;
   accessing from the database, by the computer, the vehicle parameters for the type of the vehicle;
   on the basis of the vehicle parameters for the type of the vehicle, identifying, by the computer, anchor points of the vehicle for retaining loads and retention means of the vehicle for retaining loads to the anchor points;
   providing to the computer information indicative of characteristics of the loads to be loaded in the vehicle including quantity, weights, and volumes of the loads;
   verifying, by the computer, that a total weight of the loads to be loaded in the vehicle does not exceed a predefined limit;
   on the basis of the vehicle parameters for the type of the vehicle, determining, by the computer, maximum accelerations and decelerations of the vehicle depending on mission data indicative of various mission configurations;
   as a function of at least one available loading volume, calculating, by the computer, loading configuration for the vehicle depending at least on the anchor points and the retention means and the load characteristics, the loading configuration employing at least some of the anchor points and the retention means of the vehicle for retaining the loads to be loaded in the vehicle;
   on the basis of the vehicle parameters for the type of the vehicle including the maximum accelerations and decelerations of the vehicle, determining, by the computer, forces that might be exerted on the anchor points and possible movements of the loads for the loading configuration;
   verifying, by the computer, that said possible movements of the loads and said forces that might be exerted on the anchor points for the loading configuration are below predefined maximum limits;
   loading the loads in the vehicle pursuant to the loading configuration; and
   while the loads are loaded in the vehicle according to the loading configuration, monitoring, by mechanical tensioners associated with the retaining means, tension applied to the anchor points caused by the retaining means retaining the loads and comparing, by the computer, the tension applied to the anchor points with pretension values on the retention means.

2. The method according to claim 1, further comprising displaying the loading configuration on a screen.

3. The method according to claim 1, further comprising displaying on a screen locations for loading the loads, the anchor points, and the retention means for the loading configuration.

4. The method according to claim 1, wherein the computer is part of a management system of the vehicle.

5. The method according to claim 1, wherein the computer is independent of a management system of the vehicle.

6. The method according to claim 1, further comprising displaying said loading configuration on a multifunction screen of the vehicle instrument panel.

7. The method according to claim 1, wherein the anchor points and the retention means for the loading configuration constitute connections between the loads and said anchor points, which connections present angles relative to the vertical and/or relative to the horizontal that lie within predefined angle ranges.

8. The method according to claim 1, further comprising defining a special-use zone of the vehicle that is unavailable for loading, for use in transporting an unexpected load.

9. The method according to claim 1, further comprising making unavailable anchor points that are not usable for retaining loads.

10. The method according to claim 1, further comprising during the design of the vehicle producing a document giving information about an optimum loading configuration.

11. The method according to claim 1, further comprising updating the database either regularly or else on the basis of new information becoming available.

12. The method according to claim 1, wherein the vehicle is a rotorcraft.

* * * * *